United States Patent
Elias (10) Patent No.: US 8,166,663 B2
(45) Date of Patent: May 1, 2012

(54) EVIDENCE PRESERVATION ITEMS

(76) Inventor: Lora Elias, Cleveland, OH (US)

( * ) Notice: Subject to any disclaimer, the term of this patent is extended or adjusted under 35 U.S.C. 154(b) by 0 days.

(21) Appl. No.: 12/547,718

(22) Filed: Aug. 26, 2009

(65) Prior Publication Data

US 2010/0077624 A1 Apr. 1, 2010

Related U.S. Application Data

(60) Provisional application No. 61/093,276, filed on Aug. 29, 2008.

(51) Int. Cl.
*B43L 7/027* (2006.01)

(52) U.S. Cl. .............................. 33/474; 33/429

(58) Field of Classification Search .................... 33/474, 33/476, 429, 563, 562, 565, 566, 511, 512
See application file for complete search history.

(56) References Cited

U.S. PATENT DOCUMENTS

| | | | | |
|---|---|---|---|---|
| 637,373 | A * | 11/1899 | Crawford | 33/427 |
| 937,589 | A * | 10/1909 | Freeman | 33/121 |
| 1,176,026 | A * | 3/1916 | Boone | 33/476 |
| 1,288,331 | A * | 12/1918 | White | 33/476 |
| 1,338,951 | A * | 5/1920 | Nadel | 33/277 |
| 1,708,551 | A * | 4/1929 | Nell | 33/476 |
| 1,778,922 | A * | 10/1930 | Tait et al. | 33/476 |
| D142,608 | S | 10/1945 | Ziegfeld | |
| 2,654,153 | A * | 10/1953 | Oyler | 33/474 |
| 3,172,207 | A * | 3/1965 | Prizzia, Jr. | 33/427 |
| 3,664,028 | A * | 5/1972 | Smith | 33/430 |
| 3,766,654 | A | 10/1973 | Canton | |
| 4,138,819 | A * | 2/1979 | Sosin | 33/476 |
| 4,228,592 | A * | 10/1980 | Badger | 33/562 |
| 4,461,086 | A | 7/1984 | Segletes | |
| D275,112 | S | 8/1984 | Ness | |
| 4,633,591 | A * | 1/1987 | Pikora | 33/452 |
| 4,973,069 | A | 11/1990 | Edahiro et al. | |
| 5,020,233 | A * | 6/1991 | Syken | 33/465 |
| 5,216,700 | A * | 6/1993 | Cherian | 378/163 |
| 5,269,066 | A * | 12/1993 | Walters | 33/451 |
| 5,285,785 | A * | 2/1994 | Meyer | 33/512 |
| D361,533 | S | 8/1995 | Kerry, Sr. | |
| 5,706,586 | A * | 1/1998 | Payne | 33/563 |
| D402,906 | S | 12/1998 | Sullivan | |
| 5,860,219 | A * | 1/1999 | Wilkinson | 33/528 |
| 5,875,557 | A * | 3/1999 | Ueki | 33/494 |
| 6,336,274 | B1 * | 1/2002 | Ness Webster | 33/474 |
| 6,467,179 | B1 * | 10/2002 | Wolf | 33/474 |

(Continued)

OTHER PUBLICATIONS

Evident Crime Scene Products, Deluxe Photo Documentation Kit # 8062, evidentcrimescene.com, Copyright 2007 http://web.archive.org/web/20080416215345/http://www.evidentcrimescene.com/cata/kits/kits.html.*

*Primary Examiner* — Yaritza Guadalupe-McCall (57) ABSTRACT

The kit described herein may include a first measurement element capable of measuring in at least the x and y planes without substantially moving the element. The kit may further include a second measurement element capable of measuring in at least the x and y planes without substantially moving the second element. In one embodiment, the measuring element is substantially rectangular, has an internal opening and it includes at least a first axis along the x-axis and a second axis along the y-axis. In another embodiment, the measuring element comprises an "L" shape having a first axis along the x-axis and a second axis along the y-axis, wherein each axis has a length of more than 150 cm.

15 Claims, 8 Drawing Sheets

U.S. PATENT DOCUMENTS

| | | | | |
|---|---|---|---|---|
| 6,691,422 | B1 * | 2/2004 | Aroch | 33/476 |
| 6,725,559 | B2 * | 4/2004 | Burt, Jr. | 33/653 |
| 6,840,911 | B2 * | 1/2005 | Sangha | 600/582 |
| 7,398,601 | B2 * | 7/2008 | Morrell | 33/429 |
| 7,464,480 | B2 * | 12/2008 | Vetromila | 33/436 |
| 7,581,333 | B2 * | 9/2009 | Dressler | 33/758 |
| 7,587,793 | B2 * | 9/2009 | Sangha | 422/58 |
| 7,597,849 | B2 * | 10/2009 | Sangha | 422/99 |
| 7,603,790 | B2 * | 10/2009 | Jordan et al. | 33/563 |
| 7,958,645 | B1 * | 6/2011 | Chappell | 33/476 |
| 8,065,809 | B1 * | 11/2011 | Stark | 33/456 |
| 2002/0078581 | A1 | 6/2002 | Nejad-Sattari | |
| 2006/0141427 | A1 * | 6/2006 | Harrigan | 33/429 |
| 2007/0193049 | A1 * | 8/2007 | Vetromila | 33/436 |
| 2007/0271806 | A1 * | 11/2007 | Dressler | 33/758 |
| 2008/0181538 | A1 * | 7/2008 | Shaw | 383/5 |
| 2009/0019713 | A1 * | 1/2009 | Sullivan | 33/3 A |
| 2010/0077624 | A1 * | 4/2010 | Elias | 33/474 |

* cited by examiner

EVIDENCE PRESERVATION ITEMS

RELATED APPLICATION

This application claims the benefit of copending and commonly assigned provisional U.S. Application No. 61/093,276, filed on Aug. 29, 2008; U.S. Design application Ser. No. 29/324,676, filed Sep. 17, 2008; U.S. Design application Ser. No. 29/339,657, filed Jul. 5, 2009; and U.S. Design Application No. 29/340,281, filed Jul. 16, 2009, in the name of Lora Elias, the disclosures of which are incorporated herein by reference in their entirety.

BACKGROUND OF THE INVENTION

1. Technical Field

The disclosure relates to the field of preserving evidence such that the presence of such evidence at a particular time and place may be established at a future date with a desired amount of certainty. More particularly, disclosed herein are articles and methods that may be used to sufficiently establish the previous presence of such evidence.

2. State of Art

Through the years, various techniques and items have been used to record the occurrence of a physical event for subsequent recollection of the event.

BRIEF DESCRIPTION

An embodiment of a kit that may be used to collect evidence is disclosed herein. The kit may include a first measurement element. Preferably the first element is capable of measuring in at least the x and y planes without substantially moving the element. The kit may further include a second measurement element. Preferably the second element is also capable of measuring in at least the x and y planes without substantially moving the second element.

Also disclosed herein is a measuring element which includes at least a first axis along the x-axis and a second axis along the y-axis. Preferably the measuring element is substantially rectangular and it has an internal opening.

A further measuring element disclosed herein is a measuring element comprising an "L" shape having a first axis along the x-axis and a second axis along the y-axis, wherein each axis has a length of more than 150 cm.

Additionally disclosed herein is a method of collecting evidence of an event. The method includes the step of measuring evidence of an event using one or more of the afore mentioned measuring elements and preserving the evidence relative to at least one of the measuring elements.

It is to be understood that both the foregoing general description and the following detailed description provide embodiments are intended to provide an overview or framework of understanding and nature and character of the disclosure as it is claimed. The accompanying drawings are included to provide a further understanding of the claims and are incorporated in and constitute a part of the specification. The drawings illustrate various embodiments of the claims and together with the description serve to describe the principles and operations disclosed.

DETAILED DESCRIPTION

Disclosed herein are items that may be included in a kit which may be used by law enforcement or other individuals to record contemporaneously the presence of a physical event such that it may subsequently established to a sufficient amount of certainty of the prior occurrence of the physical event. Non-limiting examples of such physical events may include bite marks, bruising, tire marks, foot prints, hand prints, presence of DNA, etc. Such events may be present in any combination thereof.

Figure 1:
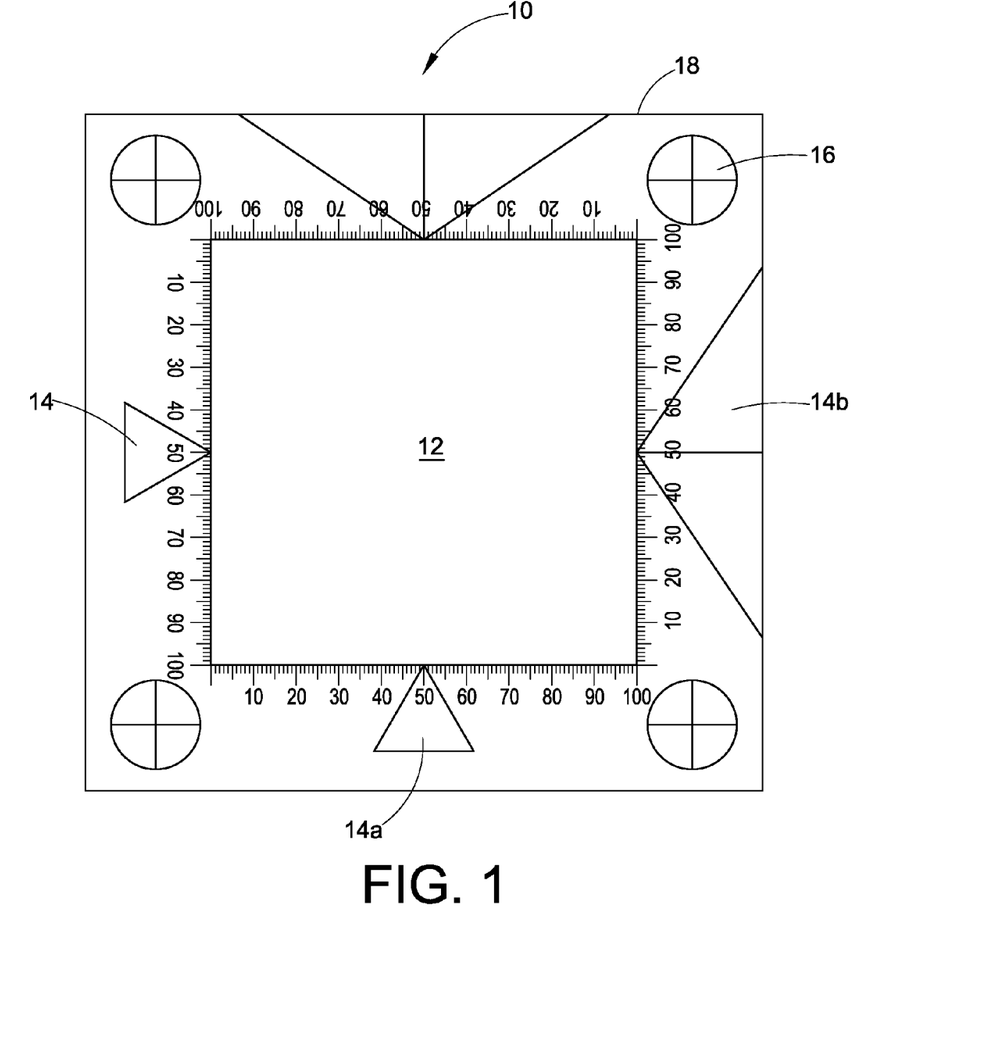
FIG. 1 is a plan view of an embodiment of measurement element.

The kit may include a first measurement element capable of measuring in at least the x and y planes without substantially moving the first element and a second measurement element capable of measuring in at least the x and y planes without substantially moving the second element. One example of the first measuring element is shown in FIG. 1, generally designated 10. As shown, the first element 10 has a substantially rectangular shape, in one such embodiment the shape is square, and includes an internal opening 12.

Preferably, element 10 includes at least one graduated scale for measuring a physical event along its x-axis and along its y-axis. As shown in FIG. 1, along each side of opening 12, element 10 includes a graduated scale for measuring. As shown, the scale is from 0 to 100 mm, marked in 1 mm increments. However, element 10 is not limited to any particular unit of measure or graduated scale.

Additionally it is preferred that element 10 and graduated scale have sufficient contrast in color that the graduated scale is plainly visible to the naked eye, preferably plainly visual to the ordinary observers of a photograph of element 10 being used to preserve a physical event. In one particular, element 10 is constructed out of a material which has a color any from water white to bright white and the graduated scale is in a color plainly visible on the material, e.g.; black. In another embodiment, element 10 is a dark color such as black and the graduated scale is a contrasting color to element 10, e.g.; water white, clear, white, yellow, etc. Alternative a fluorescent material may be used to make the markings on the scale. The fluorescent material is not limited to any particular color.

Element 10 further includes a midpoint indicator 14 along each graduated scale. Midpoint indicators 14 may be the same or different on each element 10. Preferably, midpoint indicator 14 is located along the midpoint of a graduated scale which midpoint indicator 14 is adjacent. As shown in FIG. 1, midpoint indicators 14 include an equilateral triangle 14a and isosceles triangle 14b. Midpoint indicators 14 are not limited to the afore triangles, any particular triangle, other shape, or desired symbol may be used. Midpoint indicators 14 may be along one of more of the graduated scales of element 10.

As shown in FIG. 1, element 10 may further include one or more centering points 16, preferably at least two centering points. As shown in FIG. 1, centering points 16 are circular. In on particular embodiment, each centering point 16 has a 2 cm diameter and a cross hatch. Centering points 16 shown have tangents ½ cm from the outer edge 18 of element 10. Centering points 16 are not limited to any particular shape and they may be the same or different shape.

In a further embodiment (not shown) element 10 may be double sided, such that element 10 would include a first set of graduated scales on a first face of element 10 and second set of graduated scales on a second face of element 10. This embodiment may or may not further include the above midpoint indicators 14 and centering points 16 on each face of element 10. In a preferred embodiment, the color of the markings on a first face and the second face are different. In a further embodiment, the scale of the graduated scale on the first side is not the same as the scale of the graduated scale on the second side. For example, on the first side, the graduated scale may be marked at 1 mm increments and on the second face the graduated scale may be marked at 5 mm increments. The above also applies to elements 20 and 30 described below.

An advantage of element 10 is that it may be used to substantially surround, preferably fully surround, the physical event. Another advantage of element 10 is that may be constructed out of a material which may be capable of being written on with permanent ink. Such information as the date, description of the physical event, relevant names, case number, other identifying information, etc may be added to element 10.

An additional advantage of element 10 is that the use of midpoint indicators 14 and centering points 16 may be used to properly capture the image in a photograph and to minimize, preferably prevent, distortion of the image of the event photographed. One or more of the above advantages may also apply to elements 20 and 30 to be described below.

Figure 2:
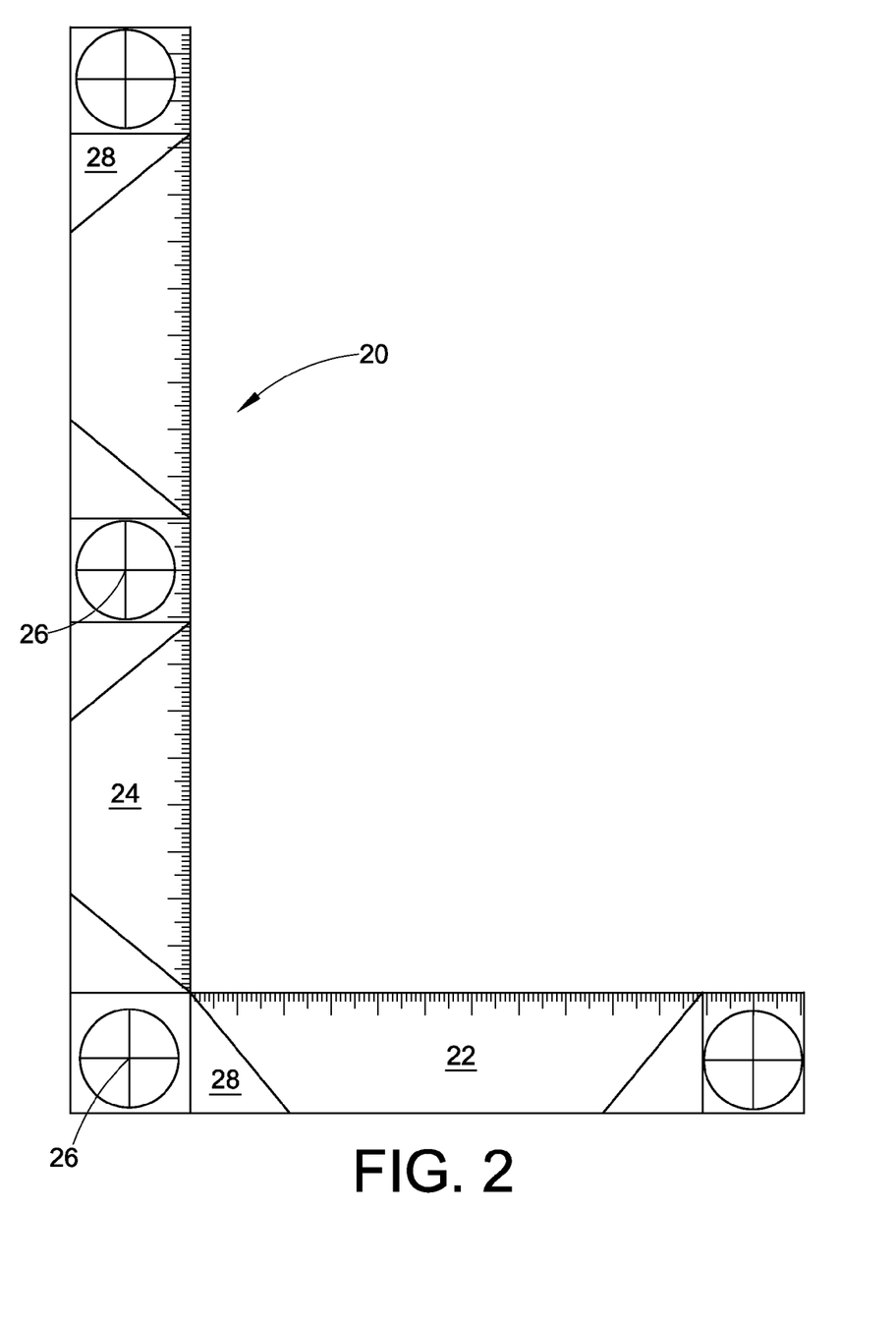
FIG. 2 is a plan view of a second embodiment of a measurement element.

As stated above, the kit may include a second measuring element. An example of the second measuring element is illustrated in FIG. 2, generally designated 20. Second element 20 as shown is generally "L" shaped. No particular shape of element 20 is required. It is preferred that element 20 has a shape which may be used to measure in both the "x" and "y" directions without having to move element 20. As shown in FIG. 2, element 2 has an x-axis arm 22 and a y-axis arm 24. Arms 22 and 24 are disposed one another in a substantially perpendicular arrangement. Element 20 may further include one or more centering points 26, similar in scope, nature, and function to those described with respect to element 10. Thus the above description of centering points 16 also applies to centering points 26. One distinction between centering points 26 as compared to points 16 as illustrated between FIGS. 1 and 2, is that centering points 26 are not only located about end points of the graduated scales on element 20.

Additionally, as shown element 20 includes a graduated scale in the x-axis direction as well as a graduated scale in the y-axis direction. In one embodiment, both the y-axis and the x-axis have the same incremental markings but the y-axis is longer than the x-axis. For example, each scale may be graduated with 1 mm apart separated markings, however, the y-axis may be longer than the x-axis or vice versa. Preferably the graduated scale along each axis is more than 150 cm long. The graduate scales may be the same or different lengths. In one embodiment, at least one of the scales is at least 175 cm long, preferably at least about 200 cm long, more preferably at least about 250 cm long, and even more preferred at least about 300 cm long. In a further embodiment, each axis has one of the afore described lengths of greater than 150 cm in any combination thereof.

Element 20 also includes one or more indicators 28, shown on FIG. 2 as a right triangle. Indicators 28 may be any preferred shape and/or marking. Also indicators 28 may the same or different on any particular element 20. Additionally, it is preferred that at least one arm 22 or 24, preferably both arms 22 and 24, include sufficient open space so that relevant information as described above with respect to element 10 may also be recorded on element 20. Furthermore, the above description regarding the material of construction of element 10 and the markings on element 10 also apply to element 20 as well as element 30 to be described below.

Figure 3:
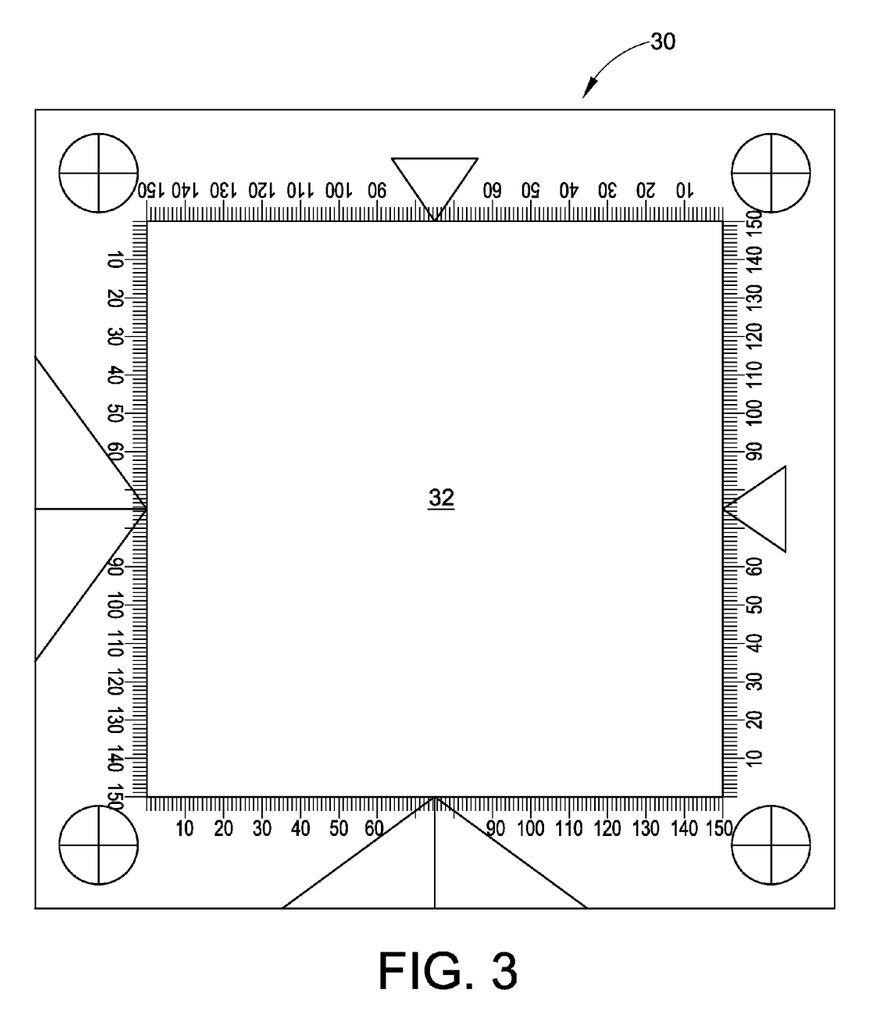
FIG. 3 is a plan view of a third embodiment of a measurement element.

As shown in FIG. 3, the kit may include a third measurement element 30 capable of measuring in at least the x and y planes without substantially moving the element. Measurement element 30 is substantially similar to measurement element 10, except that element 30 is on a larger scale than element 10. For example in one particular embodiment, the opening 32 of element 30 is at least about 25% larger than the opening 12 of element 10, preferably at least about 35% larger, more preferably at least about 40% larger, and even more preferably at least about 50% larger. As shown in FIG. 3, the graduated scale on element 30 ranges from 0 to 150 mm at 1 mm increments as compared to 0 to 100 mm for element 10. Element 30 is not limited to any particular dimensions, however it is preferred in the embodiment shown that element 30 does not have the same dimensions as element 10.

Preferably, each of the measuring elements is constructed from a material which substantially capable of being written on with permanent ink and any such writing substantially legible to the naked eye.

Particular embodiments of elements 10, 20, and 30 are not limited to any particular size. A few examples of sizes of elements 10 for any particular instance include element 10 with a internal opening of 10 cm×10 cm, 15 cm×15 cm, 20 cm×20 cm, 35 cm×35 cm, 40 cm×40 cm, and 50 cm×50 cm. The width of any particular side of element 10 is not limited to any particular size; however, typical widths may range from any where from about 2 cm to about 10 cm depending on the preference of the user. Typical diameters of the cross hatch may range from about 1 cm to about 5 cm depending on the preference of the user. In typical embodiments, dimensions of the mid point indicators may vary from about 2 cm to about 5 cm depending on the preference of the user. The above dimensions are only provided to illustrate examples sizes of element 10 and components of element 10 which may be preferred, but, not to limit the scope of the below claims.

Figure 4:
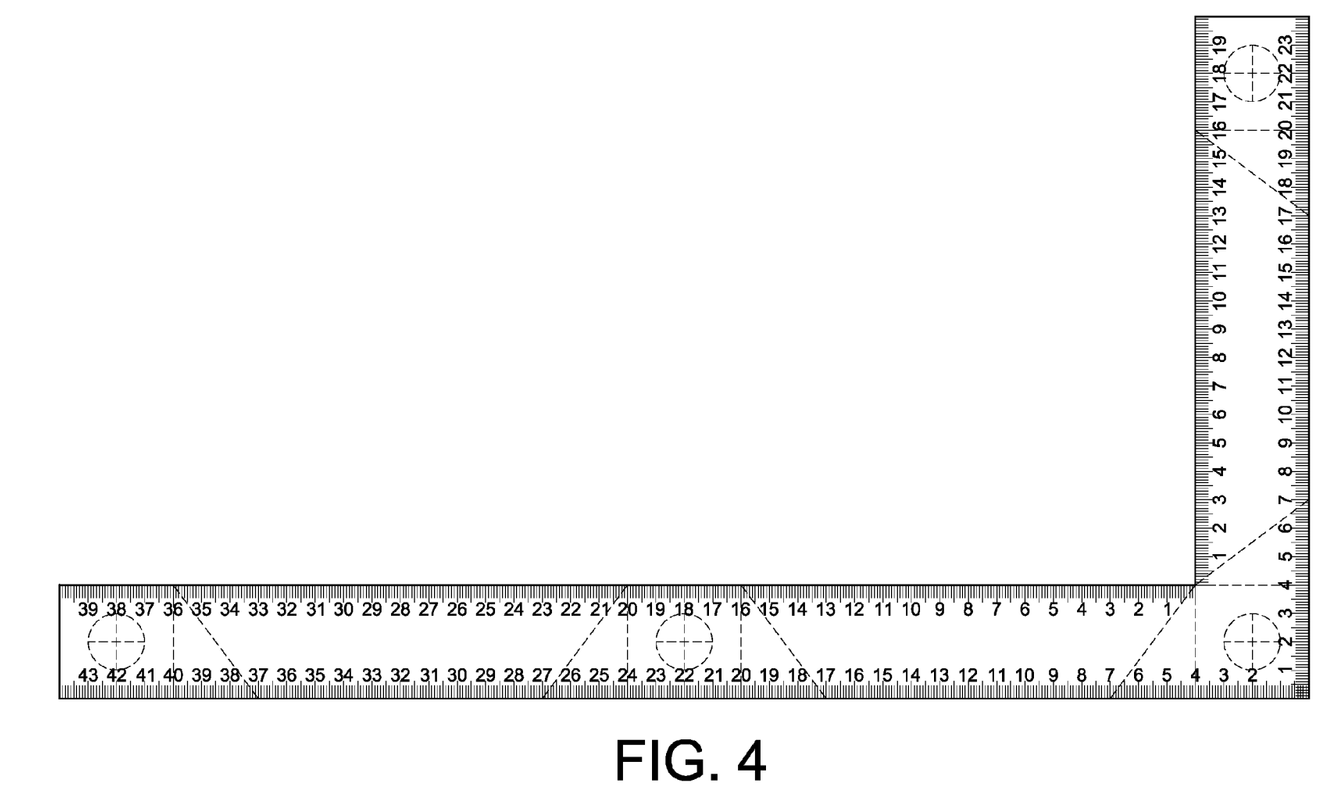
FIG. 4 is a plan view of a fourth embodiment of a measurement element.
Figure 5:
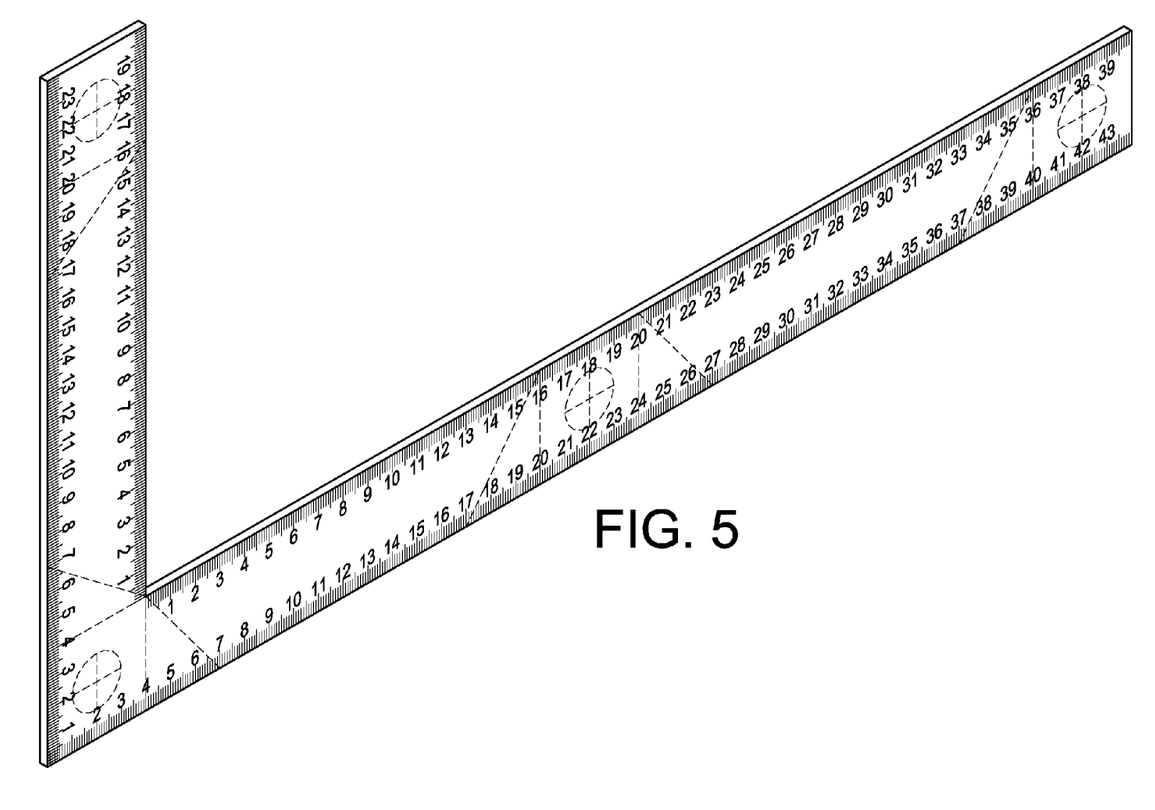
FIG. 5 is a perspective view of the fourth embodiment of the measurement element.

Shown in FIG. 4 is another version of a rectangular measurement element 40. Element 40 differs from element 10 in that element 40 includes a set of graduated marks 42 on the periphery 44 of an internal opening 46 and a second set of graduated marks 48 of a periphery of element 40. Whereas, element 10 only includes one set of graduated marks as shown in FIG. 10. Element 40 may also include all other items of element 10 as described above. As shown in FIG. 4, the other items may be in dashed lines, solid lines, or any combination thereof. Such other items include at least midpoint indicators 14 and centering points 16 as described above. Element 40, as described herein and shown, is not limited to any particular size. It can be made to any desired size and still be within the scope of this disclosure. The comment regarding the size of the measuring element applies to all embodiments of a measuring element described herein.

Figure 6:
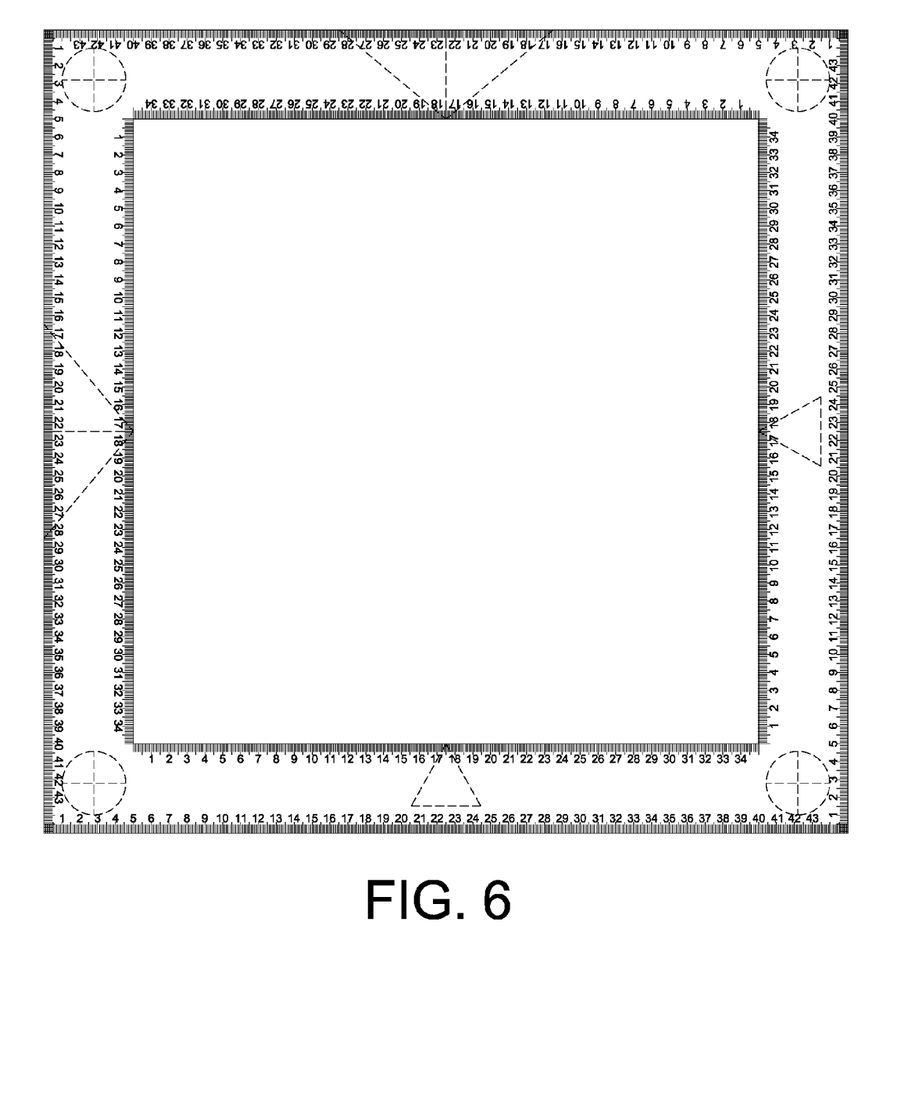
FIG. 6 is a plan view of a fifth embodiment of a measurement element.
Figure 7:
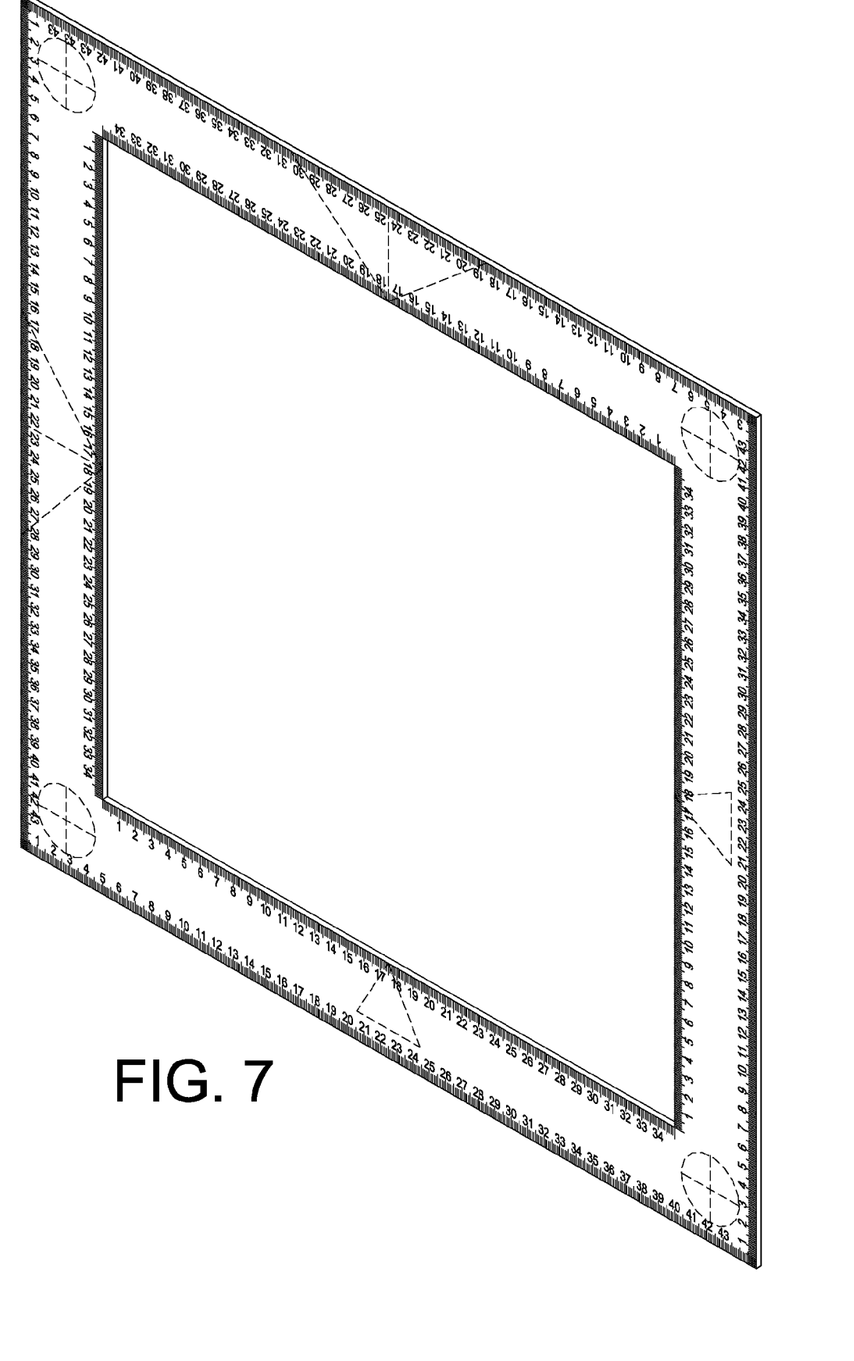
FIG. 7 is a perspective view of the fifth embodiment of the measurement element
Figure 8:
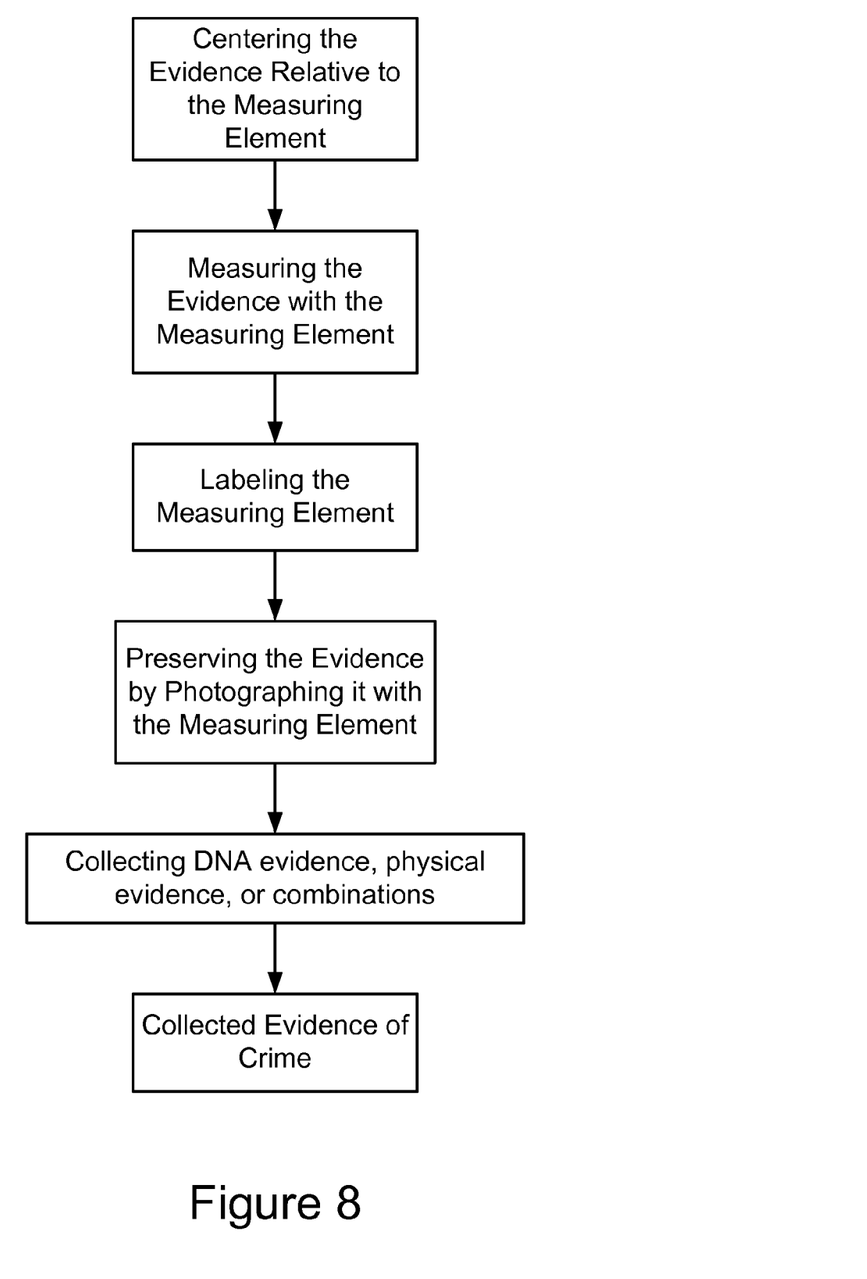
FIG. 8 is a flow chart of a method disclosed herein.

Shown in FIGS. 6 and 7 is an alternate embodiment of a measuring element shown in FIG. 2, as 20. In FIGS. 6 and 7, element 60 differs from element 20 in that element 60 has graduated marks on both the internal periphery of element 60 as well as on the external periphery of element 60. Element 60 may further include any to all of the other items on element 20, such as but not limited to centering points 26 and midpoint indicators 28.

The afore measuring elements are not limited to any particular type of measuring units. Though embodiments disclosed herein are in metric units, they are equally applicable to English measuring units as well as any other types of measuring units now known or later developed. In terms of a non-limiting example, the various measuring elements may include units in mm, cm, inches, other desired units, or combinations thereof and be within the spirit of the disclosure.

The kit may further include one or more items for collecting DNA evidence. The items may include collection elements, such as cotton swabs, glass lens, etc., and retention elements such as glass vials, plastic vials, sealable bags. The kit may also include retention elements for collecting and maintaining other types of physical evidence from the physical event, such as but not limited to clothing items of a person of interest and/or tangible items of interest located at a scene of interest, e.g.; a suspected crime scene, scene of a tort, and/or residence and/or work place of an alleged perpetrator of crime. Additionally, the kit may include latex or similar type gloves, charts or other media to document the evidence located, a camera, a flashlight and/or specialized lighting, such as but not limited to either a black light or a fluorescent light. Another optional item might include the standard and/or light sensitive photo-paper (including paper for color photographs).

In general the kit may include one or more of the general types of items such as evidence packaging supplies, personal safety equipment, presumptive drug kits, photo documentation supplies, evidence collection supplies, forensic light sources, magnifiers, ridge counters, finger printing equipment, latent print powders, lift tape, latent print enhancement materials, casting and impression materials, etc. Sources for such items may be found at www.evidentcrimescene.com and www.lightingpowder.com both of which are incorporated herein in their entirety as if fully rewritten.

In addition to the above, the kit may include instructions and forms to assist a user to record the physical event. The instructions may include the latest instructions for collecting data regarding the physical event as approved by the appropriate sanctioning body. For example for evidence of a crime, the instructions may include the most recent protocols from the police department which has jurisdiction over the physical event and/or over the location at which the event occurred.

The forms may be used to record relevant information, such as the names of victims, alleged/potential perpetrators, witnesses, addresses for all of the above, location of an event, one of the afore parties narrative of the event(s), observations of the user, diagrams, etc.

Also disclosed is a method of collecting evidence of the physical event. The method may include the use of one or more of elements 10, 20, or 30 for measuring the physical event and also preserving the evidence relative to at least one of the measuring elements. The physical event may relate to something like evidence of a crime or evidence of a tort. Examples of physical evidence may include bite marks, bruising, lacerations, abrasions, contusions, tire marks, skid marks, foot prints, other types of prints, blood spatters, latent prints, bullet holes, bruising, partial footwear impressions, trajectory, footwear pattern, all pattern injuries, etc. The existence of the physical event may be preserved through the use of video or still photography. Pictures of the physical event along with the measuring element may be taken. In one embodiment, prior to taking the picture, the physical event is centered along one of either the y-axis or the x-axis of the measuring element or both. Relevant information to the physical event may be written onto the particular measuring element 10, 20, or 30 used to reference the physical event. The method may also include one or more of the steps of collecting and preserving physical events relative to DNA or types of tangible items which can be removed from a scene of an event or of interest.

All cited patents and publications referred to in this application are incorporated by reference in their entirety.

The invention thus being described, it will be obvious that it may be varied in many ways. Such variations are not to be regarded as a departure from the spirit and scope of the present invention and all such modifications as would be obvious to one skilled in the art are intended to be included within the scope of the following claims.

What is claimed is:

1. An evidence kit comprising:
   a. A monolithic first measurement element capable of measuring in at least the x and y planes without substantially moving the element, the first element having a substantially rectangular shape and includes an internal opening for measuring evidence; and
   b. A second measurement element capable of measuring in at least the x and y planes without substantially moving the second element.

2. The kit of claim 1 wherein a shape of the second element comprises substantially "L" shaped.

3. The kit of claim 1 further comprising a third measurement element capable of measuring in at least the x and y planes without substantially moving the element, a shape of the third element comprises substantially rectangular and the third element includes an internal opening, the opening of the third element comprises at least about 50% more area than the internal opening of the first element.

4. The kit of claim 1 wherein at least one of the measuring elements further includes a centering point at each end of each scale separate from the scales.

5. The kit of claim 4 wherein each measuring element includes at least one midpoint indicator between one or more of the centering points between the two end points of a scale.

6. The kit of claim 5 wherein the midpoint indicator along the x axis differs than the midpoint indicator along the y axis.

7. The kit of claim 1 wherein at least one of the first measurement element and the second measurement element include at least one surface having a first set of graduated marks on an interior of the surface and a second set of graduated marks on an exterior of the surface.

8. A method of collecting evidence of a crime comprising measuring evidence of a crime using one or more of the measuring elements of claim 1 and preserving the evidence relative to at least one of the measuring elements.

9. The method of claim 8 wherein the preserving photographing the evidence along with the measuring element one or more times.

10. The method of claim 8 further comprises centering the evidence relative to at least one of the x-axis or the y-axis of the measuring element.

11. The method of claim 10 labeling the measuring element with identification information relative to the crime.

12. The method of claim 10 further comprising collecting at least one of DNA evidence, physical evidence, and combinations thereof.

13. A measuring element comprising a first surface, the first surface having at least a first axis along the x-axis and a second axis along the y-axis on the first surface, a second surface, the second surface having at least a first axis along the x-axis and a second axis along the y-axis on the second surface, a substantially rectangular shape, and an internal opening, wherein in the element being a unitary piece.

14. The measuring element of claim 13 further comprising a centering reference point at each end point of at least one x-axis and a centering reference at each end point of at least one y-axis.

15. The measuring element of claim 13 further comprising a midpoint indicator along at least one x axis and a midpoint indicator along at least one y axis.

* * * * *